(12) United States Patent
Peiser et al.

(10) Patent No.: US 12,344,479 B2
(45) Date of Patent: Jul. 1, 2025

(54) TRANSFER PULLING MEANS AND SYSTEM AND CONVEYING DEVICE HAVING SUCH A TRANSFER PULLING MEANS

(71) Applicant: Dematic GmbH, Heusenstamm (DE)

(72) Inventors: Thomas Peiser, Gratwein-Straßengel (AT); Lukas Fink, Pernegg an der Mur (AT)

(73) Assignee: Dematic GmbH, Heusenstamm (DE)

( * ) Notice: Subject to any disclaimer, the term of this patent is extended or adjusted under 35 U.S.C. 154(b) by 210 days.

(21) Appl. No.: 18/178,063

(22) Filed: Mar. 3, 2023

(65) Prior Publication Data

US 2023/0278805 A1    Sep. 7, 2023

(30) Foreign Application Priority Data

Mar. 4, 2022 (DE) .......................... 102022105189.7

(51) Int. Cl.
*B65G 17/20* (2006.01)
*B65G 23/04* (2006.01)

(52) U.S. Cl.
CPC ............. *B65G 17/20* (2013.01); *B65G 23/04* (2013.01)

(58) Field of Classification Search
CPC .............................. B65G 17/20; B65G 23/04
See application file for complete search history.

(56) References Cited

U.S. PATENT DOCUMENTS 9,957,110 B2 * 5/2018 Kaeser ................... B65G 17/12
2007/0182953 A1    8/2007 Tassic

FOREIGN PATENT DOCUMENTS

| DE | 10135659 A1 | 2/2003 |
|---|---|---|
| DE | 202014007861 U1 | 11/2014 |
| DE | 102014105767 A1 | 10/2015 |
| EP | 2886494 A1 | 6/2015 |
| EP | 2918520 A1 | 9/2015 |
| EP | 3028960 A1 | 6/2016 |
| EP | 3225571 A1 | 10/2017 |
| EP | 3750834 A1 | 12/2020 |

OTHER PUBLICATIONS

CN106043864 (Year: 2018).*
CN_106043864 (Year: 2016).*
DE202014007861 (Year: 2014).*

* cited by examiner

*Primary Examiner* — Gene O Crawford
*Assistant Examiner* — Lester III Rushin
(74) *Attorney, Agent, or Firm* — Gardner, Linn, Burkhart & Ondersma LLP

(57) ABSTRACT

Non-driven transfer pulling means of a conveying device for conveying hanging objects, wherein at least one z-shaped adapter bracket having at least one entrainer prong is fastened to the transfer pulling means, wherein the entrainer prong is arranged in a substantially parallel offset manner with respect to a main body of the adapter bracket and extends substantially in parallel with a main transverse extension direction of the transfer pulling means and, owing to its positioning and shape, is suitable to engage with a head part of a holding adapter supported the conveying device and used for holding objects to be conveyed, in order to permit onwards conveyance of the holding adapter.

20 Claims, 6 Drawing Sheets

TRANSFER PULLING MEANS AND SYSTEM AND CONVEYING DEVICE HAVING SUCH A TRANSFER PULLING MEANS

The present application claims the priority benefits of German application no. DE 10 2022 105 189.7, filed on Mar. 4, 2022.

BACKGROUND AND FIELD OF INVENTION

Transfer pulling means and system and conveying device having such a transfer pulling means The invention relates to a non-driven transfer pulling means of a conveying device for conveying hanging objects, a system having a driven conveying chain which is continuously movable in a conveying direction and also having a transfer pulling means, and a conveying device for conveying hanging objects having such a transfer pulling means.

A conveying device for conveying hanging objects, such as e.g. items of clothing, bags and the like, is a sorting and distributing device and has an important role in intralogistics where it is frequently used as an interface between storage and delivery. In order to meet the increasing demands of customers, conveying devices undergo constant further development, in particular with respect to process safety and efficiency.

Generic conveying devices have rail profiles, on which holding adapters are mounted and guided. The holding adapters, preferably fitted with rollers, are mounted and guided in particular in a lower region of the rail profile, in particular in a so-called free running rail. The hanging objects are releasably fastened to the holding adapters, preferably below the free running rail. In addition, a conveying chain of the conveying device is disposed in the rail profiles and the holding adapters can be coupled to said conveying chain in order to be conveyed. For this purpose, entrainers of the conveying chain engage in particular on a head part of the holding adapter, which extends preferably into a region of the rail profile located above the free running rail. In order to transfer individual holding adapters out of a first rail profile into a second rail profile and thus to allocate said holding adapters to corresponding processes, the rail profiles are connected together via so-called switch points.

In order to achieve maximum throughput for the conveying device, it is necessary to transfer the holding adapters very precisely at the switch points. It should also be ensured that the holding adapters, having the objects hanging thereon, transported off via the switch point are transported away by the first rail profile without colliding with holding adapters, or objects hanging thereon, transported onwards along the first rail profile. In addition, failure of the switch point should be avoided because the failure of an individual switch point can affect the entire conveying device.

The holding adapters, and thus the objects fastened thereto, are transferred at the switch points by the conveying chain to a transfer pulling means. The onwards transport of the holding adapters in the switch points is also effected via the transfer pulling means. The transfer pulling means can be driven via a separate drive device.

EP 3 225 571 A1 discloses a conveying device in which the switch point comprises an overdrive. However, a drive belt of the switch point for producing the overdrive is connected to a conveying chain of the conveying device by means of rollers and coupling elements. The drive belt is driven by the conveying chain such that the running speed of the drive belt in operation is greater than the running speed of the conveying chain.

EP 2 886 494 A1 discloses that the transfer is effected in the switch points by means of elastically formed fingers protruding perpendicularly to the conveying direction. The fingers engage with the neck of the holding adapters at the bottom. A disadvantage is that in the case of rough-running holding adapters, the fingers can skip over a holding adapter and therefore the present distance between the holding adapters disappears.

SUMMARY OF THE INVENTION

The present invention to provides a transfer pulling means, a system and a conveying device having such a transfer pulling means, by means of which friction-free and efficient transfer of hanging objects, e.g. at a switch point of the conveying device, is ensured.

In accordance with one embodiment of the invention, a non-driven transfer pulling means of a conveying device for conveying hanging objects is provided, wherein at least one z-shaped adapter bracket having at least one entrainer prong is fastened to the transfer pulling means. The entrainer prong is arranged in a substantially parallel offset manner with respect to a main body of the adapter bracket and extends substantially in parallel with a main transverse extension direction of the transfer pulling means and, owing to its positioning and shape, is suitable to engage with a head part of a holding adapter supported the conveying device and used for holding objects to be conveyed, in order to permit onwards conveyance of the holding adapter.

In other words, the transfer pulling means is provided with an adapter bracket that is protruding perpendicularly to a conveying direction of the conveying device and perpendicularly to the main transverse extension direction of the transfer pulling means, said adapter bracket comprising an entrainer prong which likewise extends perpendicularly to the conveying direction but substantially in parallel with the main transverse extension direction of the transfer pulling means. The main transverse extension direction is to be differentiated in particular from a further transverse extension direction arranged perpendicularly to the main transverse extension direction. In the main transverse extension direction, the transfer pulling means has a larger transverse extension than in the further transverse extension direction.

The z-shape of the adapter bracket is produced by virtue of the fact that the entrainer prong is arranged in a substantially parallel offset manner with respect to the main body of the adapter bracket.

The adapter bracket includes the entrainer prong formed to be resistant to twisting and therefore onwards conveyance is ensured even in the case of heavy objects supported the holding adapters. Therefore, the main body is may be flat.

The adapter bracket is fastened to the transfer pulling means preferably by means of an integrally bonded connection.

In one embodiment the transfer pulling means can be used to guide the holding adapter only at its head part. The head part of the holding adapter is to be differentiated from the neck part of the holding adapter. The neck part is arranged on the side of the head part remote from the transfer pulling means and in particular in the region of conveying rollers of the holding adapter which is preferably mounted so that it can roll. In addition to the head part and the neck part, the holding adapter comprises in particular two conveying rollers and an interface for receiving the object to be conveyed. However, it is also feasible for the holding adapter to be designed differently, i.e. to have different, fewer or additional components.

By means of the transfer pulling means in accordance with the invention, in particular the arrangement of the at least one entrainer prong, the efficiency and process safety can be increased when transferring the holding adapters and thus the hanging objects and the maintenance outlay can be reduced. Therefore, a higher throughput for the conveying device can also be achieved.

In an advantageous manner, provision is made that the transfer pulling means is a transfer chain, a transfer belt or a transfer cable.

In the case of the transfer chain, the entrainer prong extends substantially in parallel with a chain pin of the transfer chain. In other words, the transfer chain is provided with an adapter bracket comprising an entrainer prong which extends perpendicularly to the conveying direction but substantially in parallel with a chain pin of the transfer chain.

The "main frame" of the transfer chain is formed in particular as a roller chain which includes, in a generic manner, outer plates, inner plates, chain pins and rollers. A roller chain of size 10B-1 can be used for example. It is also feasible for the "main frame" of the transfer chain to be formed as a pin chain, wherein in that case this comprises the aforementioned elements, but without the rollers.

The adapter bracket is fastened to the outer plate connecting two chain links. Production of the transfer chain in accordance with the invention is hereby simplified. The outer plate and the adapter bracket can also be produced in one piece.

In a particular embodiment, provision is made that the adapter bracket includes a second entrainer prong which likewise is arranged in a substantially parallel offset manner with respect to the main body of the adapter bracket and extends substantially in parallel with the main transverse extension direction of the transfer pulling means. The two entrainer prongs of the adapter bracket are then arranged spaced apart from each other like the prongs of a fork.

The second entrainer prong, owing to its positioning and shape, is likewise suitable to engage with a head part of a holding adapter in order to permit onwards conveyance of the holding adapter.

The second entrainer prong has the advantage that a distance between a plurality of holding adapters arranged in the conveying device can be set in a more variable manner compared with adapter brackets with only one entrainer prong. It is also feasible for the adapter bracket to comprise more than two entrainer prongs which, owing to their positioning and shape, are suitable to engage with a head part of the holding adapter.

The distance between a plurality of holding adapters arranged in the conveying device can also be set in a more variable manner with different adapter brackets in which one entrainer prong is arranged on one side ("left") and one on the other side ("right"), as seen in plan view of the adapter bracket. However, in contrast the design with two entrainer prongs has the advantage that identical parts can be used, whereby the production of the adapter bracket is more cost effective.

In a particular embodiment, provision may be made that at least one engagement element is fastened to the transfer pulling means, in particular to the main body of the adapter bracket, the transfer pulling means being able to be coupled to a further chain, in particular a conveying chain of the conveying device, by means of the engagement element.

The engagement element can thus be provided for engagement into a further chain, in order in particular to produce an overdrive from a driven chain to the non-driven transfer pulling means.

The engagement element can be formed as a pinion tooth or as a cone. When the engagement element is formed as a pinion tooth, a form-fitting coupling between the transfer pulling means and the conveying chain is produced when the element engages into the conveying chain.

The size and possibly the shape of the pinion tooth correspond to the size and shape of a tooth from a chain wheel used to deflect the further chain. This has the advantage that the engagement of the pinion tooth into the further chain is rendered possible in a process-safe manner. The size and shape of the pinion tooth can correspond e.g. to one tooth from a chain wheel having 36 teeth.

When the engagement element is formed as a cone, a form-fitting and force-fitting coupling between the transfer pulling means and the conveying chain can be produced when the element engages into the conveying chain.

As an alternative to the adapter bracket, the engagement element can also be fastened to another part of the transfer pulling means, e.g. an additional positioning and fastening element. It is then e.g. possible to alternately provide an adapter bracket and a positioning and fastening element for the engagement element in a longitudinal extension of the transfer pulling means. The engagement element can also be fastened directly to the transfer pulling means, wherein in that case this has a shape or structure which permits positioning of the engagement element, a process which is necessary for the intended use.

The transfer pulling means designed in such a manner has the advantage that the complexity and number of parts of the conveying device, in particular a switch point arranged therein, can be reduced owing to the omission of a dedicated drive or an overdrive which enables the transfer pulling means to have a speed different from that of the conveying chain.

In an embodiment, the engagement element is arranged on the same side of the z-shaped adapter bracket, with respect to which the at least one entrainer prong is also arranged in an offset manner.

The engagement element is thus arranged in particular "beneath" the transfer pulling means and on an inner side of the adapter bracket, in particular on an inner side of the main body.

Such an arrangement of the engagement element may have the advantage that a small deflection radius of the transfer pulling means is permitted without any collision between two adjacent adapter brackets or engagement elements.

In a structurally simple manner, the engagement element is formed as an injection-moulded part. The design of the engagement element as an injection-moulded part permits comparatively cost-effective production.

In addition or as an alternative, provision can be made that the engagement element is fastened to the transfer pulling means, in particular to the main body of the adapter bracket, by means of a releasable connection.

It is feasible for the releasable connection to be a snap-fit connection, also referred to as a click or clip connection. Alternatively, the engagement element can be fastened to the transfer pulling means by means of another form-fitting or force-fitting releasable connection, e.g. a screw connection or a rivet connection.

The releasable fastening of the engagement element has the advantage that this is replaceable. Replaceability may be necessary for example when a great amount of wear is to be expected on the engagement element, in particular a greater amount of wear than on other parts of the transfer pulling means.

In a likewise structurally simple manner, the adapter bracket is formed as a stamped/bent part. The design of the adapter bracket, also referred to as adapter sheet, as a stamped/bent part has the advantage that this/these can be produced in a comparatively cost-effective manner.

The invention is also directed to a system having a driven conveying chain which is continuously movable in a conveying direction, and also having a transfer pulling means in accordance with the invention. The conveying chain and the transfer pulling means are arranged with respect to each other, in particular one above the other, such that the at least one engagement element of the transfer pulling means engages into the conveying chain, in particular between two chain pins or rollers of the conveying chain, in order to establish force transmission from the conveying chain to the transfer pulling means and thereby to drive the transfer pulling means.

In other words, the transfer pulling means is coupled to the conveying chain by the engagement of the at least one engagement element into the conveying chain which is provided for conveyance or transport of the holding adapters and thus the hanging objects along a conveying direction in the conveying device. An overdrive is produced by the coupling of the transfer pulling means to the conveying chain. The size of the engagement element is adapted to the conveying chain, in particular the distance between the outer or inner plates, the distance between the pins or rollers and the radius of the pins or rollers.

Optionally, at least four engagement elements of the transfer pulling means are simultaneously engaged with the conveying chain in order to ensure uniform force transmission.

The system is not limited to the conveying chain and the transfer pulling means and can of course include further elements.

Owing to the overdrive, a dedicated drive for the transfer pulling means is not required. Therefore, there is also no tolerance compensation which is necessary when coupling two driven pulling means.

In an advantageous embodiment of the system, provision is made that the transfer pulling means is designed as a transfer chain and the conveying chain and the transfer chain have chain links of the same size and the engagement element of the transfer chain has such a shape that the smoothest possible synchronisation of the speeds of both chains occurs when initiating the engagement.

The use of chain links of the same size has the advantage that, when the transfer chain engages into the conveying chain, the pins of the two chains lie one above the other, preferably precisely. The precision when transferring the holding adapters and thus the hanging objects is hereby increased.

In order to ensure the smooth synchronisation, the engagement element has a conical shape or conical flanks, wherein the engagement is then initiated in a friction-free manner via one of the conical flanks. The mechanical stress of the system is hereby reduced.

The invention is also directed to a conveying device, also referred to as a hanging conveyor system, for conveying hanging objects. The conveying device in accordance with the invention comprises holding adapters for holding objects to be conveyed and comprises a system in accordance with the invention. The transfer pulling means is arranged in particular at a switch point of the conveying device, in particular in a sorting area of the conveying device.

In accordance with an embodiment, provision is made that entrainer fingers, in particular in the form of extended chain pins, are arranged on the conveying chain and are used to be able to convey the holding adapters supported the conveying device, and the entrainer prongs of the adapter bracket have the same pitch as the entrainer fingers of the conveying chain so that when transferring a holding adapter from the conveying chain to the transfer pulling means, the entrainer prongs of the adapter bracket are arranged in parallel with the entrainer fingers of the conveying chain.

In other words, when coupling the transfer pulling means to the conveying chain, the entrainer prongs of the adapter bracket run at the same height as the entrainer fingers of the conveying chain. The entrainer fingers of the conveyor chain—just like the entrainer prongs of the adapter bracket—are suitable to engage with the head part of the holding adapter.

As soon as the transfer pulling means is so engaged with the conveying chain, the entrainer prongs and entrainer fingers thereof are positioned with respect to each other such that the holding adapter is initially transported by the two pulling means together, before the transfer pulling means or the conveying chain then alone takes on the holding adapter and conveys it onwards. A high level of precision is hereby permitted when transferring the holding adapter from the conveying chain to the transfer pulling means, but also from the transfer pulling means to the conveying chain.

Further details of the invention will become clear from the following description of exemplified embodiments by reference to the drawing, in which

Figure 1:
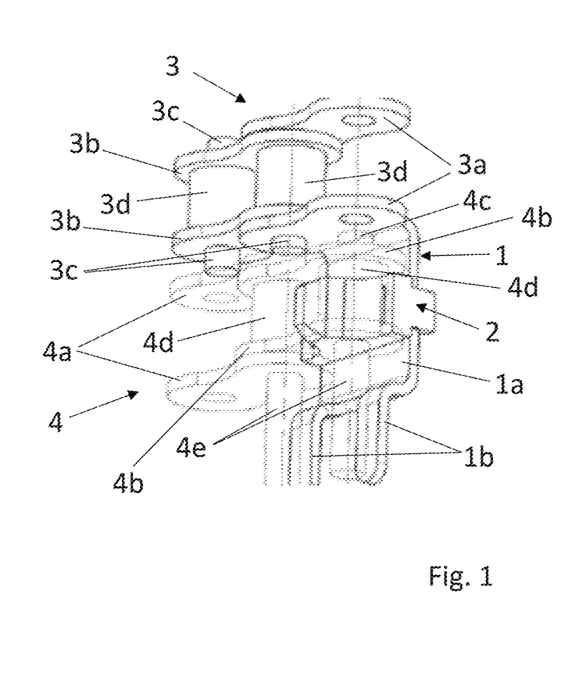
FIG. 1 shows a schematic perspective view of part of an embodiment of the system in accordance with the invention.
Figure 2:
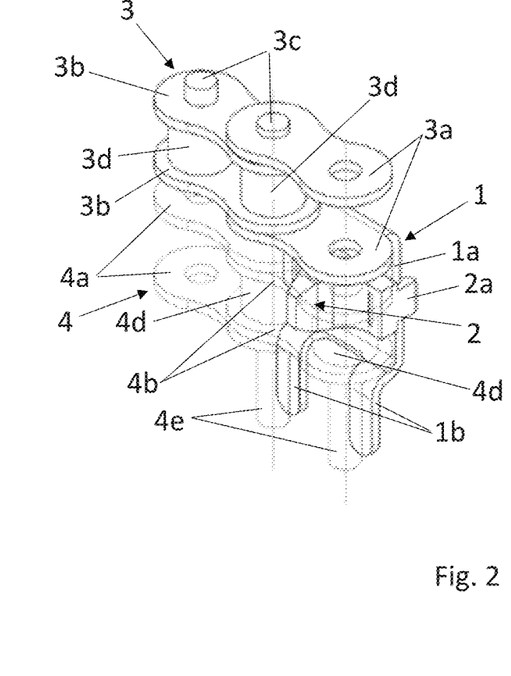
FIG. 2 shows a further schematic perspective view of part of the embodiment of the system of FIG. 1.

FIG. 1 shows a schematic perspective and sectional view of an embodiment of the system in accordance with the invention. FIG. 2 shows a further schematic perspective and sectional view of the embodiment of the system of FIG. 1.

The system includes a non-driven transfer chain 3 and a driven conveying chain 4. The two chains 3, 4 are arranged one above the other in the system. The transfer chain 3 and also the conveying chain 4 are designed as roller chains in the illustrated embodiment.

The transfer chain 3 comprises outer plates 3a, inner plates 3b, chain pins 3c and rollers 3d. The transfer chain 3 includes a multiplicity of the aforementioned components. However, for the sake of simplicity only one pair of each component is illustrated in each case.

The transfer chain 3 further comprises an adapter bracket 1. In the present embodiment, the adapter bracket 1 has, in addition to a main body 1a, two entrainer prongs 1b which are arranged spaced apart from each other like the prongs of a fork. Alternatively, it is of course possible for the adapter bracket 1 to comprise one or more than two entrainer prongs 1b. The entrainer prongs 1b are arranged in a parallel offset manner with respect to the main body 1a of the adapter bracket 1. The thus produced z-shape of the adapter bracket 1 can be clearly seen in both figures. The entrainer prongs 1*b* also extend in parallel with the chain pins 3*c* of the transfer chain 3, which likewise can be clearly seen in the aforementioned figures.

The transfer chain 3 additionally includes a pinion tooth 2. In the present embodiment, the pinion tooth 2 is fastened to the adapter bracket 1, more precisely to the main body 1*a* of the adapter bracket 1. The pinion tooth 2 is arranged on the same side of the z-shaped adapter bracket 1, with respect to which the entrainer prongs 1*b* are also arranged in an offset manner. The pinion tooth 2 is releasably fastened by means of a snap-fit connection (see also FIG. 4). The size and shape of the pinion tooth 2 can correspond e.g. to one tooth from a chain wheel having 36 teeth.

Alternatively, the pinion tooth 2 can also be fastened to another part of the transfer chain 3, e.g. to an additional positioning and fastening element, or to the transfer chain 3 by means of an alternative form-fitting connection or a force-fitting connection, e.g. a screw connection. It is also possible for the pinion tooth 2 to be fastened directly to the transfer chain 3, wherein the pinion tooth 2 then has a shape or structure corresponding to the intended use.

Furthermore, in addition to outer plates 4*a*, inner plates 4*b*, chain pins 4*c* and rollers 4*d*, the driven conveying chain 4 also comprises entrainer fingers 4*e* which are an extension of the chain pins 4*c* in the illustrated embodiment. The conveying chain 4 includes a multiplicity of the aforementioned components. Also in this case, for the sake of simplicity only one pair of each component is illustrated in each case.

It can be clearly seen how the pinion tooth 2 engages into the conveying chain 4 and, more precisely, between two rollers 4*d* of the conveying chain 4 for coupling the two chains 3, 4. Force transmission is hereby established from the conveying chain 4 to the transfer chain 3. As a result, the transfer chain 3 can be driven in the form of an overdrive.

Figure 3:
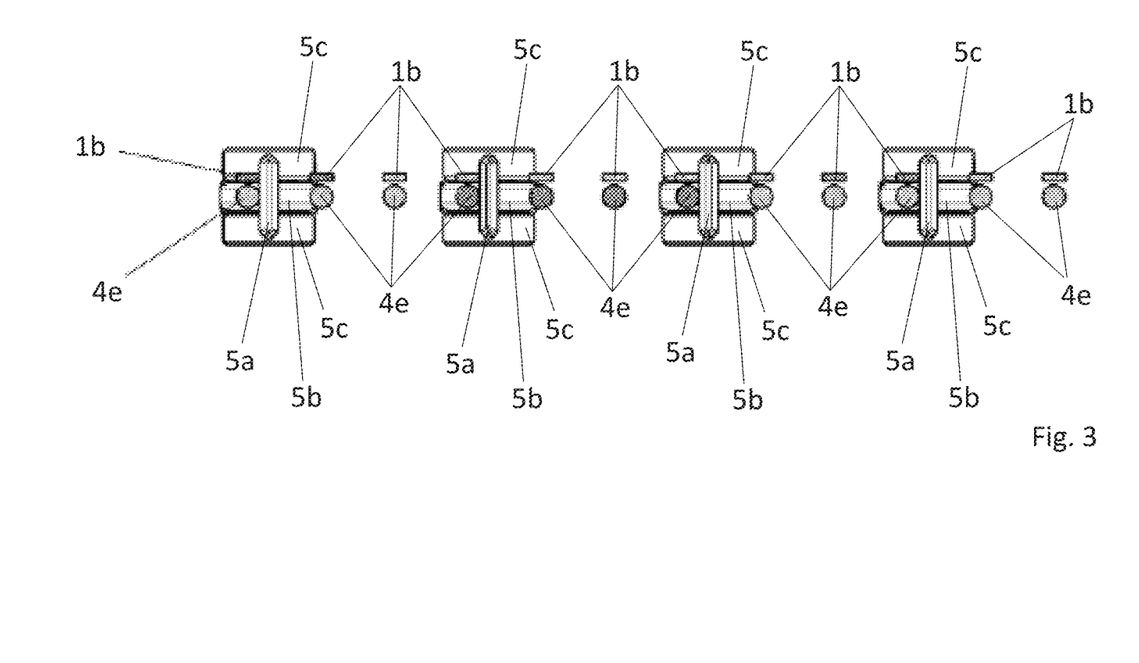
FIG. 3 shows a combined schematic and partial view including a sectional view of entrainer prongs and entrainer fingers and a plan view of the holding adapter.

It can likewise be clearly seen that the entrainer prongs 1*b* are arranged at the same height as the entrainer fingers 4*e* (see also FIG. 3).

FIG. 3 shows a combined schematic and sectional view including a sectional view of entrainer prongs 1*b* and entrainer fingers 4*e* and a plan view of the holding adapter 5.

Each holding adapter 5 has a head part 5*a*, a neck part 5*b*, two conveying rollers 5*c* and a non-illustrated (see in this respect FIG. 5) interface 5*d* for receiving an object 10 to be conveyed. However, it is also feasible for the holding adapter 5 to be designed differently, i.e. to have different, fewer or additional components.

The view in FIG. 3 clearly shows that the entrainer prongs 1*b* of the adapter bracket 1 have the same pitch as the entrainer fingers 4*e* of the conveying chain 4 and that the entrainer prongs 1*b* and entrainer fingers 4*e*, which are arranged in parallel or at the same height, lie against or engage with the head part 5*a* of the holding adapter 5.

Figure 6:
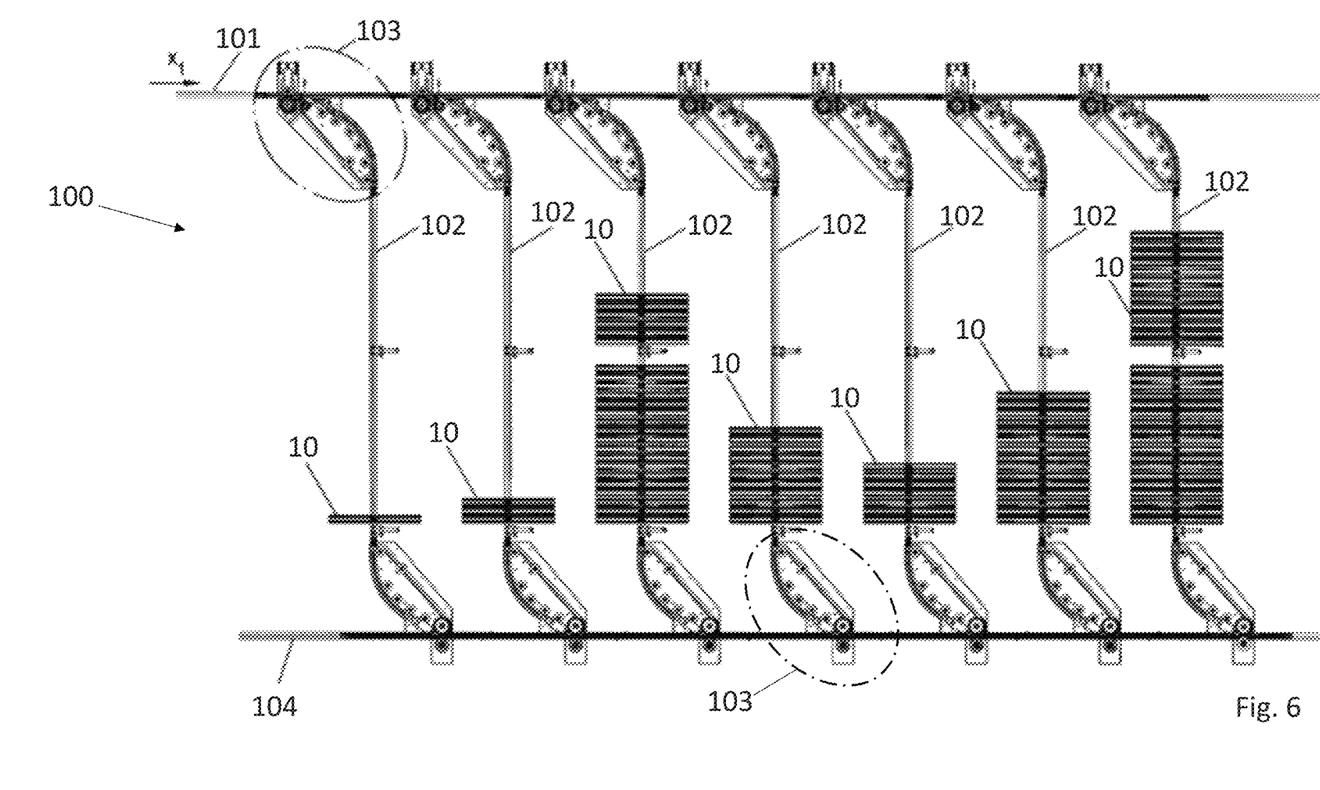
FIG. 6 shows a schematic plan view of part of an embodiment of the conveying device in accordance with the invention.

This is necessary for a friction-free transfer between the chains 3, 4 and a friction-free crossover from e.g. a first rail profile 101 to a second rail profile 102 of the conveying device 100 (see FIG. 6).

Figure 4:
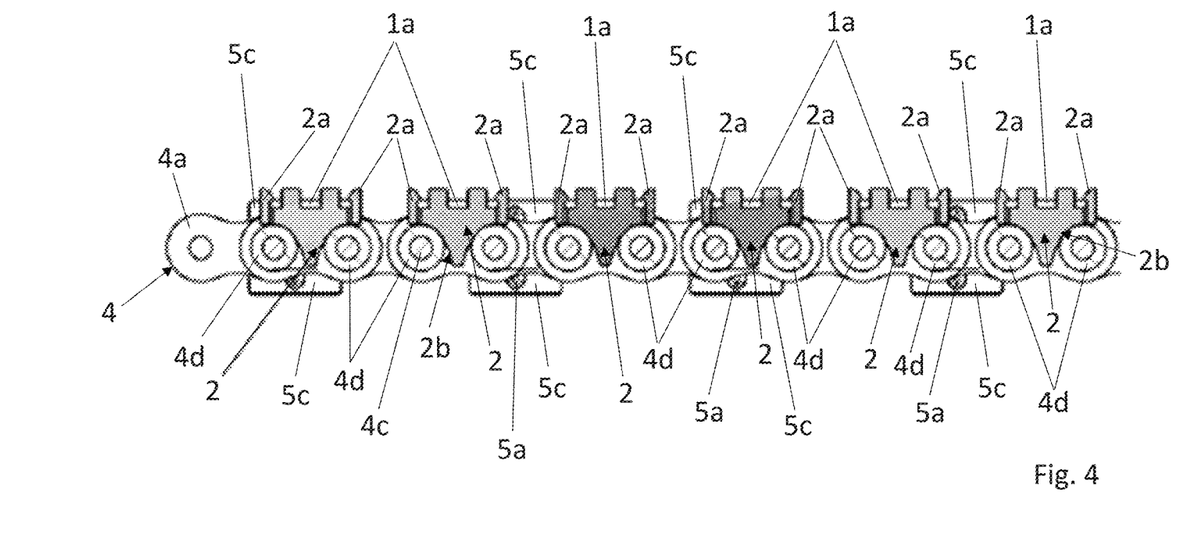
FIG. 4 shows a schematic and sectional view of part of a conveying chain and pinion teeth engaging therein.

FIG. 4 shows a schematic sectional view of part of a conveying chain 4 and pinion teeth 2 engaging therein.

This view clearly shows how each pinion tooth 2 engages into the conveying chain 4. When engaged, the pinion tooth 2 is arranged between two rollers 4*d*.

This view likewise clearly shows the shape of the pinion tooth 2. In the present case, the pinion tooth 2 has conical flanks 2*b*, whereby the smoothest possible synchronisation of the speeds of both chains 3, 4 is permitted when initiating the engagement of the pinion tooth 2 into the conveying chain 4.

The snap-fit connection, by means of which the pinion tooth 2 is releasably fastened in each case to the main body 1*a* of the adapter bracket 1, includes two snap hooks 2*a* in the illustrated embodiment. The snap hooks 2*a* engage around the main body 1*a*. However, it is also feasible for the snap hooks 2*a* to alternatively engage through the main body. In order to ensure that the (vertical) position of the pinion tooth 2 is maintained during operation, in the present case further "penetrations" of the pinion tooth 2 through the main body 1*a* are provided.

Figure 5:
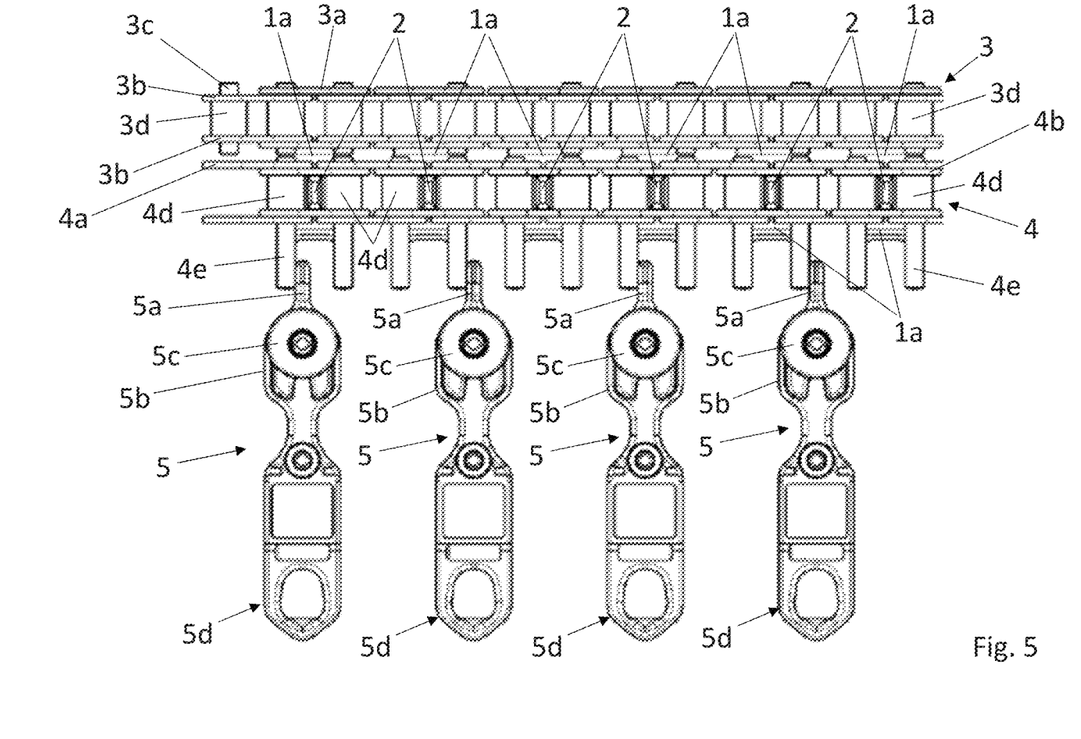
FIG. 5 shows a schematic front view of part of the embodiment of the system of FIG. 1 and a plurality of holding adapters.

FIG. 5 shows a schematic front view of part of the embodiment of the system of FIG. 1 and a plurality of holding adapters 5.

This view clearly shows that the conveying chain 4 and the transfer chain 3 comprise chain links of the same size. The positioning of the two chains 3, 4 with respect to each other is hereby improved and thus the precision is increased when transferring the holding adapter 5 from the conveying chain 4 to the transfer chain 3 or from the transfer chain 3 to the conveying chain 4.

The additionally shown holding adapters 5 have an interface 5*d* for holding the objects 10 to be conveyed. The holding adapters 5 also have a conveying roller 5*c* in the region of their neck part 5*b* and a head part 5*a* arranged thereabove. The head part 5*a* is engaged for onwards conveyance of the holding adapter 5 by the conveying chain 4 but also by the transfer chain 3.

From among the adapter brackets 1 of the transfer chain 3 which are arranged in this view behind the conveying chain 4 and primarily the main body 1*a* thereof, only parts—one between the two chains 3, 5 and one beneath the conveying chain 4—can be seen. The entrainer prongs 1*b* of the adapter bracket 1 cannot be seen at all in this view because they are located behind the entrainer fingers 4*e* of the conveying chain 4*e* in the present view. With regard to the pinion tooth 2, only a tip can be seen in each case between the rollers 4*d* of the conveying chain 4.

FIG. 6 shows a schematic plan view of part of an embodiment of the conveying device 100 in accordance with the invention. The illustrated part or section can be referred to as a sorting section.

At that location, the conveying device 100 comprises a first rail profile 101, wherein the objects to be conveyed are conveyed along the first rail profile 101. At a feed point (not shown), the objects to be conveyed are fed to the first rail profile 101.

The conveying chain 4 of the first rail profile 101 is continuously movable therein in a conveying direction $x_1$. The conveying chain 4 can be driven in particular by means of friction rollers arranged along the first rail profile 101.

The holding adapters 5 are mounted and guided in a rollable manner in the first rail profile 101. The head part 5*a* of the holding adapters 5 can be coupled to the conveying chain 4, as shown for example in FIGS. 4 and 5.

Switch points 103 are arranged at several positions along the first rail profile 101, by means which holding adapters 5 and any objects 10 mounted thereon can be transferred into a second rail profile 102.

It is feasible for the switch points 103 to be controlled or switched owing to a prior identification of the holding adapters 5 or objects 10. The identification can be effected e.g. when feeding the holding adapter 5 and thus the object 10 attached thereto into the first rail profile 101. The switch point 103 would then be controlled or switched via the counting of cycles, which each correspond to a predefined distance along the first rail profile 101, since the feeding of the holding adapter 5, and thus the object 10 attached thereto, into the first rail profile 101.

Alternatively, the identification can be effected by means of an identification unit arranged in a region of the first rail profile 101 upstream of the respective switch point 103 and also referred to as a reading unit. Therefore, the switching time of the switch point 103 can be determined even more precisely even in the case of longer conveying paths in which the cycles do not precisely correspond to the travelled path of the holding adapter 5 from the feed point to the respective switch point 103 by reason of possible length expansions of the conveying chain 4.

If the identification thus shows that the holding adapter 5 or the object 10 to be conveyed is to be conveyed out of the first rail profile 101 via the switch point 103, then accordingly a control element of the switch point 103 is shifted so that the holding adapter 5 is transferred into a rail profile 103*a* (see FIG. 7) of the switch point 103 during onwards transportation by shifting the switch point 103, and from there is transferred into the second rail profile 102 and is transported onwards along the second rail profile 102. If the identification does not show this, then transport is continued along the first rail profile 101.

In the variant of the conveying device shown in FIG. 6, the second rail profiles 102 are used as temporary holding areas in which the objects 10 to be conveyed are temporarily held. The objects 10 supported the second rail profile 102 can be transported onwards to a third rail profile 104 during further progress via further switch points 103.

In order to permit friction-free transfer of the holding adapters 5 or the objects 10 to be conveyed from the first rail profile 101 via the respective switch point 103 into the second rail profile 102 or from the second rail profile 102 via the respective switch point 103 into the third rail profile 104, the transfer chain 3 shown in FIGS. 1 to 5 and described above or the system shown therein and described above is used.

Figure 7:
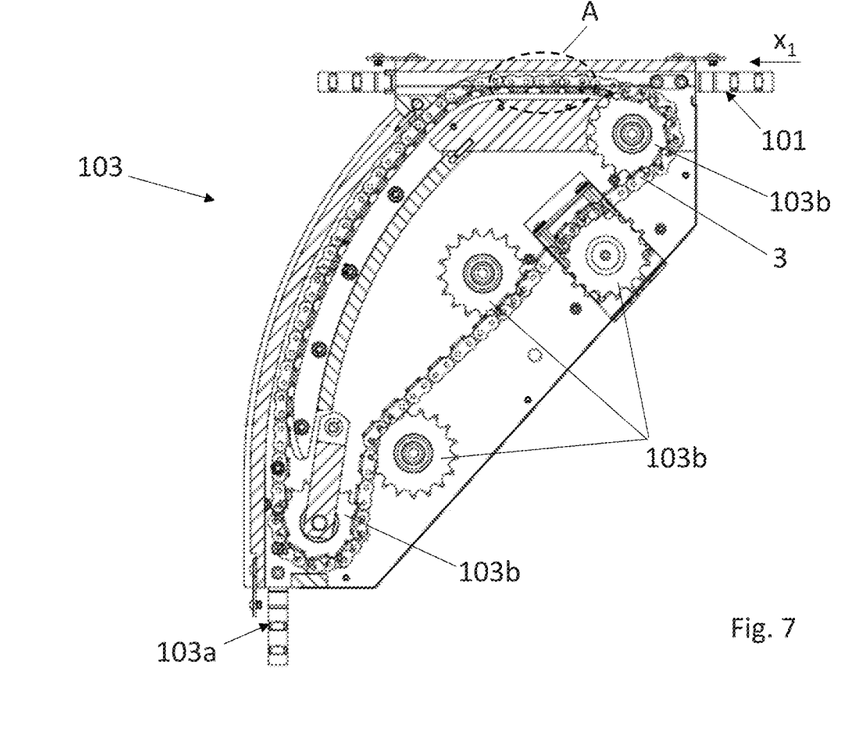
FIG. 7 shows a schematic sectional view of a switch point of the conveying device of FIG. 6.

FIG. 7 shows a schematic sectional view of a switch point 103 of the conveying device 100 of FIG. 6.

As described in relation to FIG. 6, the holding adapters 5 and therefore also any objects 10 mounted thereon can be transferred out of the first rail profile 101 into a second rail profile 102 or out of the second rail profile 102 into the third rail profile 104 by means of the switch point 103.

The switch point 103 comprises a control element, not shown, and a rail profile 103*a* in which the head part 5*a* of the respective holding adapter 5 is mounted and guided. In order to convey the holding adapters 5 and the objects hanging thereon, the switch point 103 comprises a transfer chain 3. The transfer chain 3 is deflected via chain wheels 103*b*.

As shown in FIGS. 1 to 5, the transfer chain 3 comprises adapter brackets 1 having entrainer prongs 1*b* for conveying the holding adapters 5 onwards. The entrainer prongs 1*b* are in contact with the respective head parts 5*a* of the holding adapters 5 and move the holding adapters 5 along the first rail profile 101 towards the second rail profile 102 or along the second rail profile 102 towards the third rail profile 104.

The switch point 103 does not comprise a dedicated drive. In contrast, the transfer chain 3 is driven by a coupling, established by means of pinion teeth 2, to a conveying chain 4, which occurs in the coupling region A.

Changes and modifications in the specifically described embodiments can be carried out without departing from the principles of the present invention which is intended to be limited only by the scope of the appended claims, as interpreted according to the principles of patent law including the doctrine of equivalents. The priority German application no. DE 10 2022 105 189.7, filed on Mar. 4, 2022, is hereby incorporated by reference, in particular for support with regard to the translation for the present disclosure.

The invention claimed is:

1. A non-driven transfer pulling means of a conveying device for conveying hanging objects, said non-driven transfer pulling means comprising:
    at least one z-shaped adapter bracket having a main body and at least one entrainer prong, wherein the adapter bracket is fastened to the transfer pulling means, and wherein the entrainer prong is arranged in a substantially parallel offset manner with respect to the main body of the adapter bracket and extends substantially in parallel with a main transverse extension direction of the transfer pulling means, and wherein the entrainer prong, owing to its positioning and shape, is configured to engage with a head part of a holding adapter supported by the conveying device and used for holding objects to be conveyed, in order to permit onwards conveyance of the holding adapter.

2. The transfer pulling means as claimed in claim 1, wherein the adapter bracket includes a second entrainer prong, the second entrainer prong being arranged in a substantially parallel offset manner with respect to the main body of the adapter bracket and extending substantially parallel with the main transverse extension direction of the transfer pulling means, and with the two entrainer prongs being arranged spaced apart from each other like the prongs of a fork.

3. The transfer pulling means as claimed in claim 1, wherein at least one engagement element is fastened to the main body of the adapter bracket so as to be fastened to the transfer pulling means, and wherein the transfer pulling means is configured to be coupled to a conveying chain of the conveying device, by means of the engagement element.

4. The transfer pulling means as claimed in claim 3, wherein the at least one engagement element comprises a pinion tooth or a cone fastened to the transfer pulling means.

5. The transfer pulling means as claimed in claim 3, wherein the engagement element is arranged on the same side of the z-shaped adapter bracket with respect to which the at least one entrainer prong is also arranged in an offset manner.

6. The transfer pulling means as claimed in claim 3, wherein the engagement element comprises an injection-moulded part and/or is fastened to the transfer pulling means.

7. The transfer pulling means as claimed in 6, wherein the engagement element is mounted to the main body of the adapter bracket by a releasable connection.

8. The transfer pulling means as claimed in claim 1, wherein the adapter bracket is formed as a stamped/bent part.

9. The transfer pulling means as claimed in claim 1, wherein said transfer pulling means comprises a transfer chain, a transfer belt, or a transfer cable.

10. A system comprising:
    a driven conveying chain configured to be movable in a conveying direction ($x_1$); and
    a transfer pulling means of claim 3, wherein the conveying chain and the transfer pulling means are arranged with respect to each other, such that the at least one engagement element of the transfer pulling means engages into the conveying chain in order to establish force transmission from the conveying chain to the transfer pulling means and thereby to drive the transfer pulling means.

11. The system as claimed in claim 10, wherein the transfer pulling means is above the driven conveying chain.

12. The system as claimed in claim 10, wherein the driven conveying chain includes a plurality of chain pins and a plurality of rollers, and the at least one engagement element of the transfer pulling means engages into the conveying chain between two of the chain pins or rollers of the conveying chain.

13. The system as claimed in claim 10, wherein the transfer pulling means comprises a transfer chain, and the conveying chain and the transfer chain have chain links of the same size.

14. A system comprising:
a driven conveying chain configured to be movable in a conveying direction ($x_1$); and
a transfer pulling means of claim 5, wherein the conveying chain and the transfer pulling means are arranged with respect to each other, such that the at least one engagement element of the transfer pulling means engages into the conveying chain in order to establish force transmission from the conveying chain to the transfer pulling means and thereby to drive the transfer pulling means.

15. The system as claimed in claim 14, wherein the driven conveying chain includes a plurality of chain pins and a plurality of rollers, and the at least one engagement element of the transfer pulling means engages into the conveying chain between two of the chain pins or rollers of the conveying chain.

16. The system as claimed in claim 15, wherein the transfer pulling means is designed as a transfer chain and the conveying chain and the transfer chain have chain links of the same size.

17. A conveying device for conveying hanging objects, the conveying device comprising:
holding adapters for holding objects to be conveyed; and
a system as claimed in claim 10, wherein the transfer pulling means is arranged on a switch point of the conveying device, and wherein entrainer fingers are arranged on the conveying chain and are used to convey the holding adapters supported by the conveying device, and wherein the at least one entrainer prong comprises at least two entrainer prongs, and the at least two entrainer prongs of the adapter bracket have the same pitch as the entrainer fingers of the conveying chain so that when transferring an individual holding adapter from the conveying chain to the transfer pulling means, or vice-versa, the at least two entrainer prongs of the adapter bracket are arranged in parallel with the entrainer fingers of the conveying chain.

18. The conveying device as claimed in claim 17, wherein the entrainer fingers comprise extended chain pins.

19. A conveying device for conveying hanging objects, the conveying device comprising:
holding adapters for holding objects to be conveyed; and
a system as claimed in claim 13;
wherein the transfer pulling means is arranged on a switch point of the conveying device, and wherein entrainer fingers are arranged on the conveying chain and are used to be able to convey the holding adapters supported by the conveying device, wherein the at least one entrainer prong comprises at least two entrainer prongs, and the at least two entrainer prongs of the adapter bracket have the same pitch as the entrainer fingers of the conveying chain so that when transferring a holding adapter from the conveying chain to the transfer pulling means, or vice-versa, the at least two entrainer prongs of the adapter bracket are arranged in parallel with the entrainer fingers of the conveying chain.

20. The conveying device as claimed in claim 19, wherein the entrainer fingers comprise extended chain pins.

* * * * *

UNITED STATES PATENT AND TRADEMARK OFFICE
CERTIFICATE OF CORRECTION

PATENT NO. : 12,344,479 B2
APPLICATION NO. : 18/178063
DATED : July 1, 2025
INVENTOR(S) : Thomas Peiser and Lukas Fink Page 1 of 1

It is certified that error appears in the above-identified patent and that said Letters Patent is hereby corrected as shown below:

In the Claims

Column 10
Line 39, Claim 3, "conveying device, by means" should be --conveying device by means--

Signed and Sealed this
Ninth Day of December, 2025

John A. Squires
*Director of the United States Patent and Trademark Office*